Figure 1:
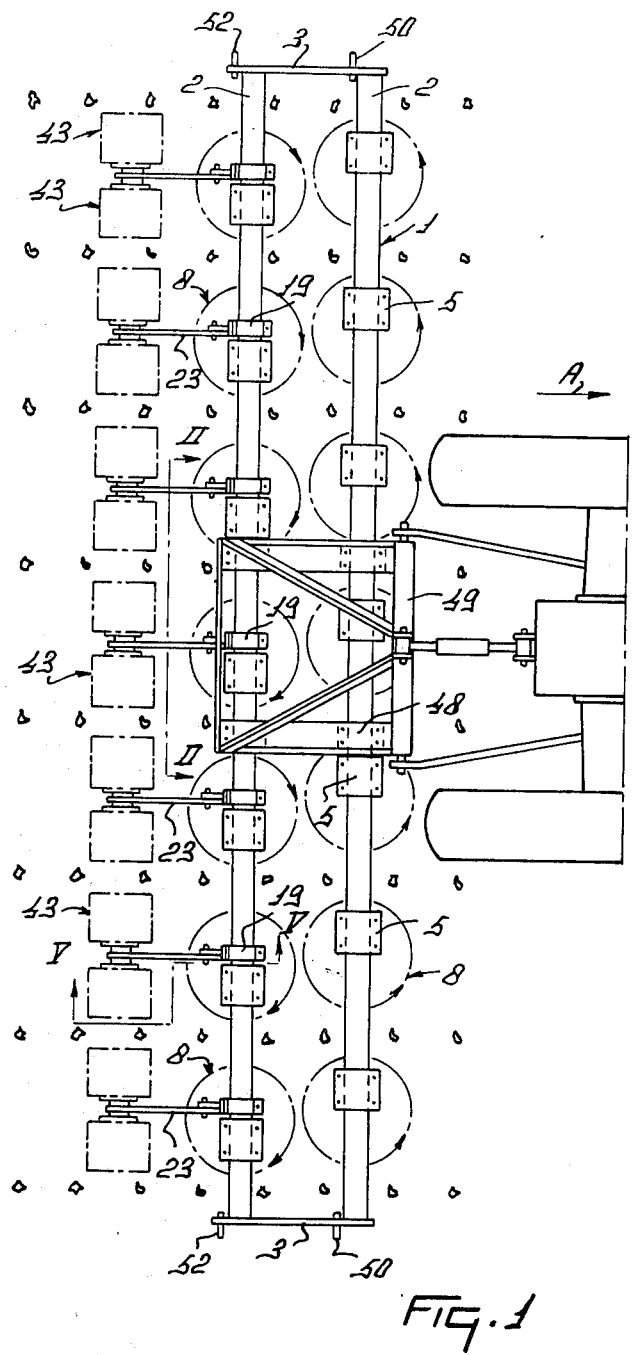

United States Patent [19]
van der Lely

[11] 4,126,186
[45] Nov. 21, 1978

[54] SOIL CULTIVATING IMPLEMENTS

[76] Inventor: Cornelis van der Lely, 7 Brüschenrain, Zug, Switzerland

[21] Appl. No.: 713,107

[22] Filed: Aug. 10, 1976

[30] Foreign Application Priority Data

Aug. 15, 1975 [NL] Netherlands .................. 7509737

[51] Int. Cl.² .................. A01B 21/06; A01B 39/08
[52] U.S. Cl. .................. 172/169; 172/149; 172/184; 172/550; 172/552
[58] Field of Search .................. 172/68, 169, 154, 172, 172/177, 184, 179, 550, 552, 121, 59, 149

[56] References Cited

U.S. PATENT DOCUMENTS

| 3,082,829 | 3/1963 | Buddingh | 172/526 |
| 3,220,488 | 11/1965 | Becker | 172/552 |
| 3,783,948 | 1/1974 | Lely | 172/59 |

FOREIGN PATENT DOCUMENTS

| 1,215,148 | 11/1959 | France | 172/526 |
| 1,286,939 | 1/1962 | France | 172/184 |
| 804,598 | 11/1958 | United Kingdom | 172/526 |

Primary Examiner—Richard J. Johnson
Attorney, Agent, or Firm—Mason, Mason & Albright

[57] ABSTRACT

A cultivating implement has rows of rotatable soil working cultivating members that are mounted on beams extending transverse to the direction of travel, one behind the other. The members rotate about upwardly extending axes and can be positioned along the beams to cooperate with one another and work soil between rows of plants. Assemblies of crumbler-rollers are secured to the frame and positioned to engage soil worked by the cultivating members but avoid the plant rows. Each assembly is secured by a support arm adjustably settable along the length of a beam at the rear of the frame. Each assembly is a pair or two rollers journalled on a common shaft and each roller has two supports, one of which is movable along the shaft to and from the other to adjust the width of the roller. Each support mounts bars that form the periphery of the roller.

15 Claims, 6 Drawing Figures

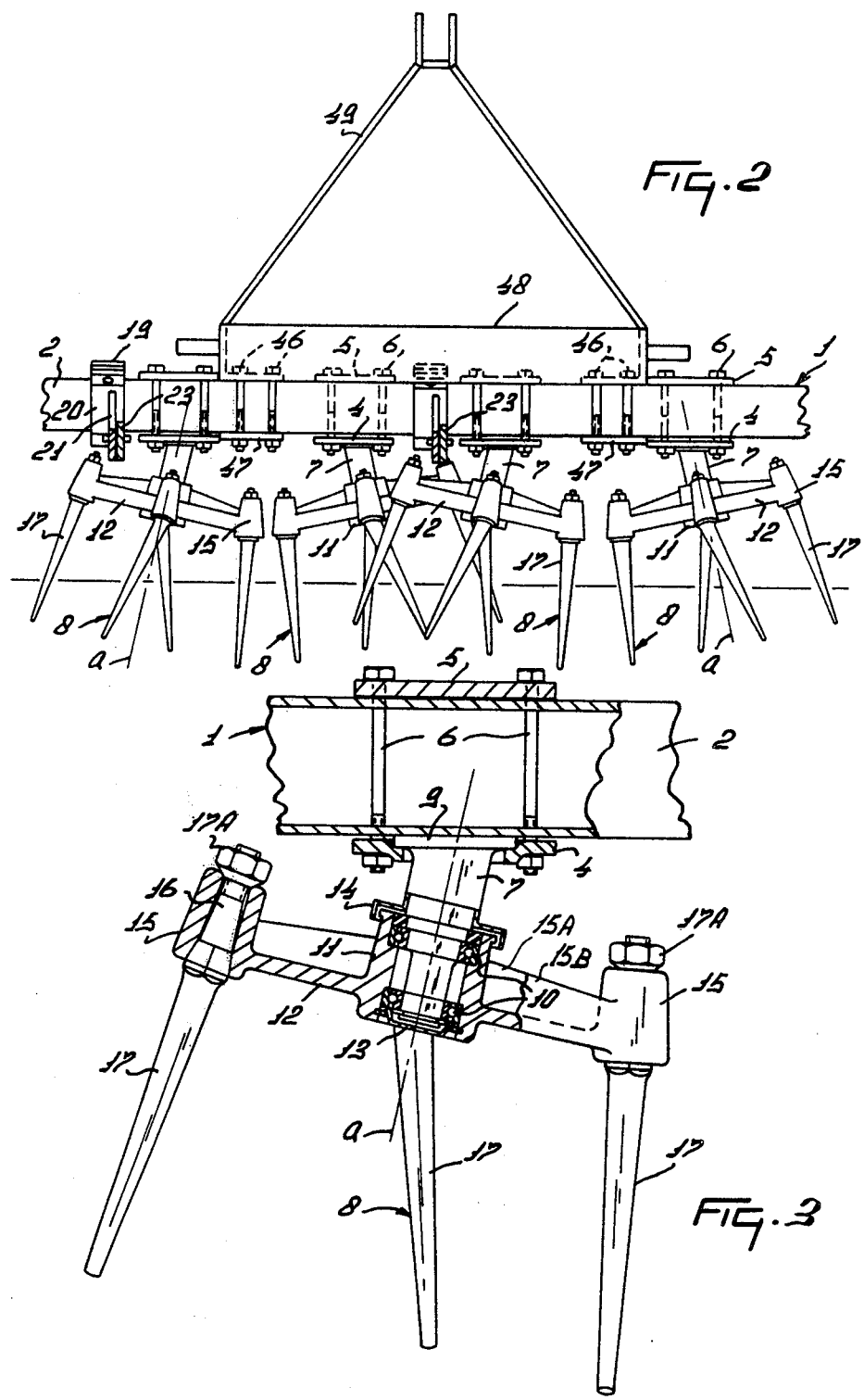

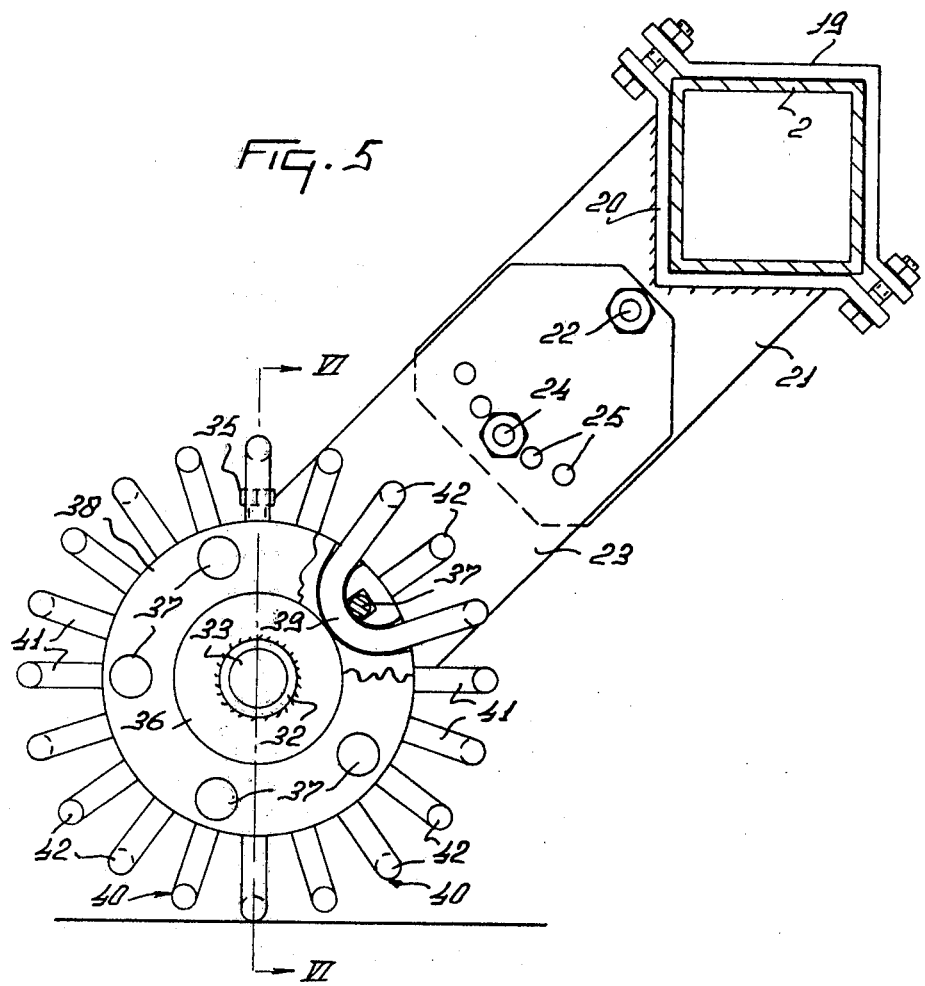

SOIL CULTIVATING IMPLEMENTS

According to one aspect of the present invention there is provided a soil cultivating implement comprising a plurality of cultivating members disposed for operation between rows of plants, the cultivating members being adapted to rotate about upwardly extending axes and being relatively arranged in two rows extending transversely of the intended direction of operative travel of the implement and disposed one behind the other, the cultivating members of at least one of the rows being adjustable transversely of said direction of travel for setting in desired working positions; the machine further comprising means for arranging crumbler-roller means behind the cultivating members relative to said direction of travel.

According to another aspect of the present invention there is provided a soil cultivating implement having crumbler-roller means comprising a crumbler-roller adapted to rotate about an axis extending at least substantially transversely of the intended direction of operative travel of the implement, and means for adjusting the effective width of this crumbler-roller.

By providing cultivating members that can be adjusted transversely of the intended direction of operative travel of the implement and/or crumbler-roller means the effective width of which can be altered, the effective operative width of the cultivating members of the implement and/or of the roller means can be varied with a view to matching the width of strips of soil between rows of plants and working substantially the whole of the strips. Thus the soil near the plant and, in particular, the weeds local to the plants can be worked.

Figure 4:
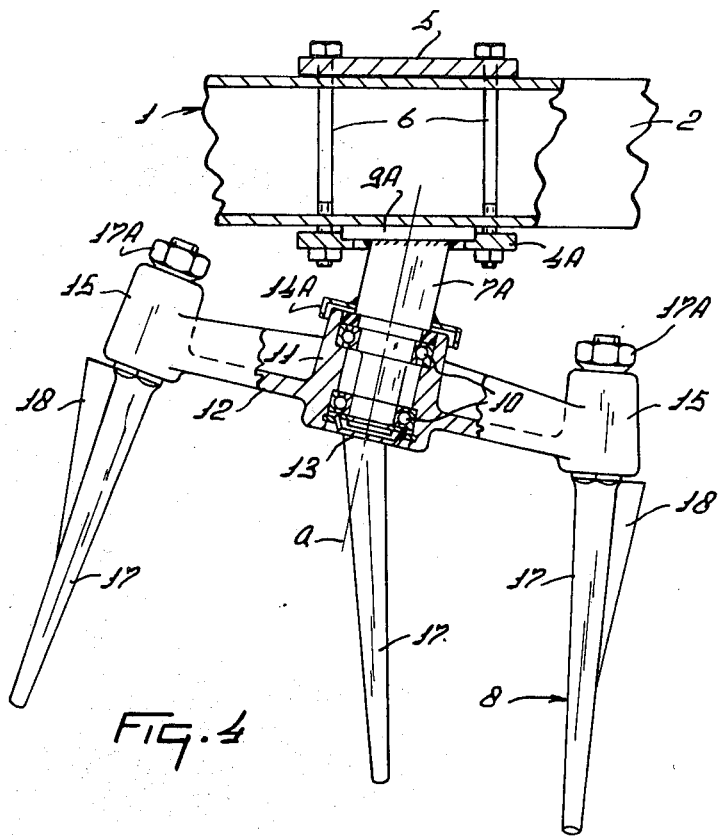
Figure 6:
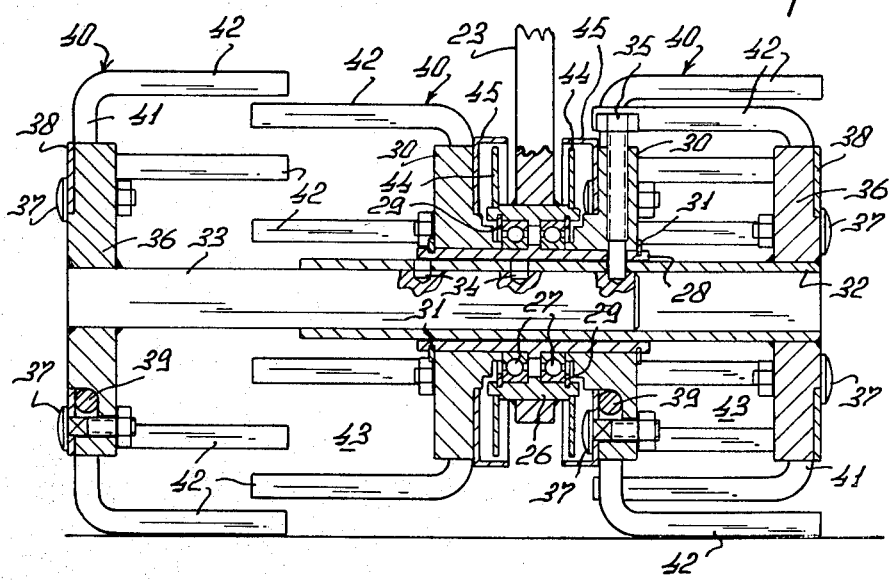
Figure 7:
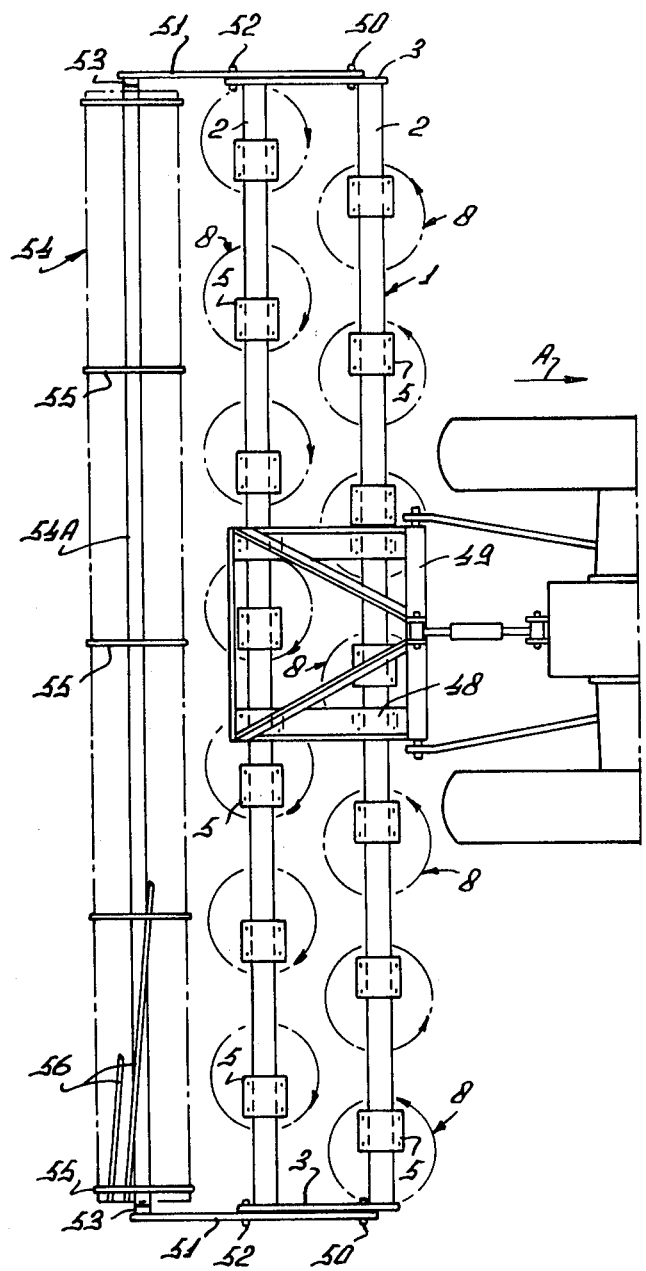

For a better understanding of the invention and to show how the same may be carried into effect, reference will now be made, by way of example, to the accompanying drawings, in which:

FIG. 1 is a plan view of a soil cultivating implement illustrated provided with a plurality of crumbler-rollers so as to be in a working condition suitable for use in row cultures, FIG. 2 is an enlarged elevational view taken on the line II—II in FIG. 1, FIG. 3 illustrates on an enlarged scale the mounting of a cultivating member on a frame beam of the implement, FIG. 4 shows an alternative form of the mounting of a cultivating member on the frame beam, FIG. 5 is an enlarged elevational view taken on the line V—V in FIG. 1 and showing the mounting of the bars of a crumbling-roller of the implement, FIG. 6 is an elevational view taken on the line VI—VI in FIG. 5, and FIG. 7 is a plan view of a soil cultivating implement illustrated provided with a single crumbler-roller covering the whole effective width of the implement which is in a working condition suitable for use in preparing a seed bed.

The soil cultivating implement of FIGS. 1 to 6 has a frame 1 having two relatively parallel, horizontal beams 2, extending transversely of the intended direction of operative travel A of the implement. At their ends the beams 2 are interconnected by means of plates 3 extending in the direction of travel A. The plates 3 extend rearwardly beyond the rearmost frame beam 2. Each of the beams 2 has at equal intervals stub shafts 7 secured thereto by lower and upper clamping plates 4 and 5 and bolts 6, each stub shaft 7 having a flange 9 which is clamped by means of the appropriate lower clamping plate 4 against the lower face of the beam 2. With respect to its flange 9 each stub shaft 7 is disposed with its longitudinal center line $a$ at an angle to the plane of the flange and hence at an angle to the vertical in the implement. On the same frame beam 2 all the stub shafts 7 are inclined in the same direction and their longitudinal center lines $a$ are all located in a common plane extending transversely of the direction of travel A and containing the longitudinal center line of the beam 2. As viewed from the rear of the cultivator, all the stub shafts 7 carried by the foremost frame beam 2 are inclined upwardly to the left, whereas all the stub shafts 7 carried by the rearmost frame beam 2 are inclined upwardly to the right.

Each stub shaft 7 freely rotatably supports a cultivating member 8. After releasing the bolts 6, the clamping plates 4, 5 and the stub shafts 7 with their respective cultivating members 8 can be adjusted in the direction of length of their beam 2 transversely of the direction of travel A so that the cultivating members 8 making up the row of such members carried by one beam can be moved into and fixed in any desired working positions relative to the cultivating members 8 making up the row of such members carried by the other beam.

In the condition of the implement shown in FIG. 1 the cultivating members 8 of the respective rows are relatively arranged so that they can co-operate in pairs each composed of a member 8 of one row and a member 8 of the other row in working a strip of soil located between rows of plants. It will be seen that the cultivating members 8 making up each pair are relatively offset, viewed in the direction of travel A, the cultivating member of the foremost row being located further to the left than the cultivating member of the rearmost row as viewed from the rear.

Referring to FIG. 3, each stub shaft 7 supports, by means of vertically spaced-apart ballbearings 10, a hub 11 of a support 12 of the cultivating member 8 mounted thereon. The hub 11 is closed at the bottom by a cover plate 13. At the top a screening cap 14 surrounding the shaft 7 and freely rotatable with respect to the hub 11 covers the annular gap between the hub 11 and the stub shaft 7. The support 12 has an angular, preferably square shape, viewed in the direction of the rotary axis formed by the longitudinal center line of the stub shaft 7, holders 15 being provided at the corners of the support 12 for the fastening portions 16 of tines 17. The holders 18 are substantially cylindrical and have their longitudinal center lines inclined, in the direction from bottom to top, towards the rotary axis $a$ of their cultivating member 8, the longitudinal center lines of diametrically opposite holders 15 being coplanar with this rotary axis $a$. Stiffening ridges 15A are provided between the holders 15 and the hub 11 and ridges 15B are provided between the holders 15 themselves.

As stated above, each holder 15 accommodates the fastening portion 16 of a tine 17, this portion 16 extending away from an operative portion of the tine and comprising a transitional part extending from the operative portion, and tapering part extending from the transitional part to terminate in a less tapering part, which itself extends to terminate in a screwthreaded part receiving a nut 17A (FIG. 3). The first-mentioned tapering part has a cross-section preferably in the form of a regular polygon, in the form illustrated a regular hexagon, the faces of which are adapted to co-operate with corresponding internal faces of a recess in the holder 15 so that each tine can be fixed, in the form illustrated, in six different positions in its holder, whilst a satisfactory securing of the fastening portion 16 in the holder 15 is ensured. The operative portion of the tine is straight away from the transitional part, tapering towards its free end in a dragging position relative to the direction of rotation of the cultivating member, its disposition being such that its longitudinal centre line is at an angle to the longitudinal center line of the fastening portion of the tine. In the form illustrated this angle is at least 8°.

In the alternative form of FIG. 4 each stub shaft 7A is welded to a flange 9A, and a screening cap 14A covering the top of the hub 11 of the support 12 is welded to the stub shaft 7A. The lower clamping plate 4A has a milled seat for the flange 9A. Each operative portion of each tine 17 in this form is provided with a radial blade 18 extending from the transitional part to near the center of the operative portion and tapering in downward direction.

Referring now to FIG. 5, the rearmost frame beam 2 is provided by means of brackets 19 and 20 with rearwardly and downwardly inclined supports 21, there being one such support adjacent each clamping plate assembly 4/5/6. In the condition of the implement shown in FIG. 1 the supports 21 are located each at least substantially near the middle of the strip of soil between two rows of plants. To each of the supports 21 is pivoted by means of a transverse bolt 22 an arm 23 having a plurality of holes through any selected one of which is passed a bolt 24, the holes 25 being located on an arc having its center on the longitudinal centre line of the bolt 22. Each arm 23 is provided at the lower end with a bearing housing 26 (FIG. 6) supporting a pair of crumbler-rollers 43, the housing 26 accommodating horizontally spaced-apart ballbearings 27. The ballbearings 27 surround a sleeve 28 whose longitudinal center line coinides with the longitudinal center line of the bearing housing 26. The ballbearings 27 are held in place by means of circlips 29 and are furthermore locked in between two flanges 30 disposed around the sleeve 28 and held in place by menas of circlips 31. In the sleeve 28 a tube 32 is slidably arranged that accommodates a longitudinally slidable shaft 33 which projects from one end of the tube 32. The length of the shaft 33 substantially corresponds with the length of the tube 22. The shaft 33 has three equally spaced recesses 34, the first of which is located near the end located in the tube 32. By means of the recesses 34 and a bolt 35 passed through the right-hand flange 30, viewed from the rear, and adapted to co-operate with a screwthread in each of the recesses 34, the shaft 33 and the tube 32 can be moved into and set in any one of three positions relative to the sleeve 28.

At their ends most remote from each other the shaft 33 and the tube 32 are each provided with a flange 36. Each flange 36 carries bars 40 that form part of the periphery of one of the crumbler-rollers 43, the bars 40 extending inwardly relative to the flange 36, parallel with the axis of rotation of the assembly 28/32/33/36, and being made up of pairs each of which is formed from a single length of spring material. Each such pair of bars consists of two roller periphery forming portions 42 that extend from radial portions 41 that are interconnected by a connecting portion 39, the portions 41 and 39 being clamped to the flange 36 by bolts 37 and a clamping plate 38. The radial portions 41 of each pair are at an angle of about 35° to one another. The length of each portion 42 is substantially equal to one-third of the length of the shaft 33 or the tube 32.

The flanges 30 on either side of the bearing housing 36 are provided, like the flanges 36, with bars 40, whose portions 42 extending parallel to the axis of rotation of the assembly 28/32/33/36 have the same length as the portions 42 of the bars 40 carried by the flanges 36. The bars carried by each of the flanges 30 are disposed so that their portions 42 are located in between the portions 42 of the bars 40 carried by the adjacent flange 36 whereby the periphery of each crumbler-roller 43 is made up of the bars carried by one or other of the flanges 36 and the bars carried by the flange 30 adjacent thereto.

Owing to the displaceability of the shaft 33 in the tube 32, and the displaceability of both the shaft 33 and the tube 32 relative to the sleeve 28, the adjacent ends of the bar portions 42 of the bars making up each crumbler-roller 43 can be set in any of a plurality of positions so that the width of each crumbler-roller 43 can be enlarged or reduced. In the position shown in FIG. 6 the right-hand crumbler-roller 43 is adjusted so that its width is not more than about half the width of the left-hand crumbler-roller 43. If it is desired to have both rollers of the same width, the shaft 33 can be displaced to the right after releasing the bolt 35, the bolt then being screwed into the extreme left-hand recess 34. If it is desired to set the bar portions 42 of the respective rollers 43 in a medium position, the central recess 34 can be used. In this manner the width of each crumbler-roller 43 on either side of the bearing housing 26 can be adapted to the width of the strip of soil between two rows of plants.

Near its ends the bearing housing 26 is provided with rings 44 located inside hoods 45 fastened to the proximal ends of the flanges 30, these hoods 45 additionally serving in fixing the bars 40.

In operation the respective pairs of crumbler-rollers 43 bear on the soil between the rows of plants and additionally support the implement. By turning the arms 23 holding each pair of rollers 43 the height of the implement frame above the ground and hence the working depth of the cultivating members can be adjusted. At the front a support 48 for a trestle 49 is secured by means of bolts 46 and clamping pieces 47 to the top of the beams 2. After releasing the bolts 46 the support can be set in a plurality of positions transversely of the direction of travel A for matching the width between the rows of plants.

In operation the implement is attached by means of the trestle 49 to the three-point lift of a tractor and the positions of the pairs of cultivating members 8, as well as the widths of the pairs of rollers 43, are adjusted in the manner described above to suit the widths of the strips of soil between the rows of plants. Since each pair of cultivating members comprises two cultivating members 8 located one behind the other, the whole strip can be worked. During the movement of the implement in the direction of the arrow A the cultivating members 8, which are freely rotatable, are caused to rotate, in the directions indicated by arcuate arrows in FIG. 1, by the ground contact of their tines 17. The blades 18 on the tines 17, where provided, ensure a more regular drive of the cultivating members. Due to the oppositely directed inclinations of the cultivating members of the two rows, the members of the foremost row rotate in a sense opposite that of the cultivating members of the rearmost row.

With the implement described the facility of being able to displace the respective cultivating members in the rows facilitates a very satisfactory, effective cultivating of the soil between the rows of plants, while the pairs of crumbler-rollers 43 can be set effectively to support the implement throughout the width thereof without the plants of the rows being damaged.

The resilient structure of the bars 40 provides not only a satisfactorily elastic support of the implement but also an advantageous effect on crumbling of the soil worked by the cultivating members, the soil being, in addition, levelled and slightly compressed so that the moisture required for the plants of the rows will be effectively retained. The implement substantially described above may also be employed for preparing a seedbed, in which case the cultivating members 8 of the respective rows can be disposed in the manner shown in FIG. 7, with the cultivating members 8 of the rearmost row being located at least substantially midway between the cultivating members of the foremost row, and the plurality of pairs of crumbler-rollers 43 being replaced by a single crumbler-roller 54. To this latter end, an arm 51 is mounted to pivot about a stub shaft 50 near the front of each plate 3, these arms extending rearwardly along the plates and being each set in any one of a plurality of positions by means of a pin 52 passed through a selected one of the holes at the rear of the relevant plate 3. Each of the arms 51 has a bearing 53 in which a stub shaft on the roller 54 is mounted, this roller serving as a rotatable supporting member that is parallel to the frame beams 2. The roller 54 has a tubular, central support 54A carrying vertical plates 55 that in turn carry near their circumferences helically disposed, elongated elements 56, formed by bars. With the aid of the roller 54, the working depth of the cultivating members 8 can be adjusted by changing the position of the arms 51 relative to the strips 3 for working the soil to a greater depth.

The construction just described provides an implement suitable for effective, universal use, that is to say, both for row cultures and for preparing a seed bed. For use in row cultures pairs of relatively co-operating cultivating members 8 of the respective rows can be relatively disposed so that the whole width of soil between the rows can be worked. The assembly is effectively supported by the pairs of crumbling-rollers 43 with their circumferential resilient bar portions 42, whose working width is adjustable by means including at least one displaceable support comprising elongated elements. The tines 17 of the respective cultivating members 8, which are caused to rotate by the ground contact of the tines can be set in six different positions so that not only by a relative bodily shift of the cultivating members but also by an adjustment of the tines a fine adaptation to the width of the soil between the rows of plants can be obtained.

In the implements described the cultivating members of each row can be adjusted transversely of the direction of travel A for setting in desired working positions. As an alternative the cultivating members of one of the rows only can be arranged to be so displaceable.

While various features of the soil cultivating implements that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. A soil cultivating implement comprising a frame and a plurality of soil working cultivating members mounted adjacent one another on said frame, said cultivating members being rotatable about corresponding upwardly extending axes and being spaced apart to work on both sides of a row of plants, at least one crumbler-roller connected to said frame and positioned at the rear of said members to engage soil worked by the cultivating members between the rows of plants, said roller being rotatable about an axis extending transverse to the direction of travel and having adjusting means that is settable to expand and contract the working width of that roller in that direction, said roller comprising two supports and said supports mounting respective elongated elements that form a ground engaging periphery of said roller, at least one of said supports being displaceable along the rotary axis of said crumbler-roller to expand and contract said working width, said one support being mounted on a shaft and the other support being mounted on a tube, said shaft being slideable in said tube.

2. A soil cultivating implement as claimed in claim 1, wherein said elongated elements are mounted on respective supports, the elements on one support each being located between the elements of the other support.

3. A soil cultivating implement as claimed in claim 2, wherein said elongated elements are bar portions that extend in the direction of said rotary axis of the roller and are fastened to the respective supports.

4. A soil cultivating implement as claimed in claim 3, wherein said bar portions terminate in radial portions arranged on their respective supports.

5. A soil cultivating implement as claimed in claim 4, wherein the radial portions of adjacent bars are at an angle of about 35° to one another.

6. A soil cultivating implement as claimed in claim 4, wherein each two adjacent bar portions are made from a single length of spring material.

7. A soil cultivating implement as claimed in claim 1, wherein each crumbler-roller is a part of an assembly that comprises two crumbler-rollers positioned side-by-side on a common shaft that defines a rotary axis.

8. A soil cultivating implement as claimed in claim 7, wherein the two crumbler-rollers of each assembly are located on either side of a bearing rotatably supporting the assembly.

9. A soil cultivating implement as claimed in claim 8, wherein both said shaft and tube are displaceable with respect to a sleeve supported from said bearing and the supports are secured to said sleeve.

10. A soil cultivating implement as claimed in claim 9, wherein said shaft is settable in any of three positions relative to said tube.

11. A soil cultivating implement as claimed in claim 10, wherein the shaft has three equidistantly spaced apart recesses, one of said recesses being located near an end of the shaft inserted in said tube, a bolt on one of said supports engaging any selected one of said recesses to fix said shaft to the tube.

12. A soil cultivating implement as claimed in claim 11, wherein said bolt passes through said sleeve to fix the shaft to said tube.

13. A soil cultivating implement comprising a frame and a plurality of soil working cultivating members mounted adjacent one another on said frame, said cultivating members being rotatable about corresponding upwardly extending axes and being spaced apart to work both sides of a row of plants, at least one crumbler-roller connected to said frame and positioned at the rear of said members to engage soil worked by the cultivating members between the rows of plants, said roller being rotatable about an axis extending transverse to the direction of travel and having adjusting means that is settable to expand and contract the working width of that roller in that direction, said roller comprising two supports and said supports mounting respective elongated elements that form a ground engaging periphery of said roller, at least one of said supports being displaceable along the rotary axis of said crumbler-roller to expand and contract said working width, said roller being one of a pair and an arm connecting said pair to said frame, said arm being settable in any one of a plurality of positions relative to said frame, and having a bearing located between the two crumbler-rollers of said pair.

14. The implement of claim 13, wherein each roller has two supports mounting respective elongated elements that form a ground engaging periphery of the roller, at least one of said supports being displaceable along the rotary axis of said roller to expand and contract said working width.

15. The implement of claim 13, wherein there are a plurality of pairs of rollers.

* * * * *